United States Patent
Michaelis et al.

(10) Patent No.: US 9,291,789 B2
(45) Date of Patent: Mar. 22, 2016

(54) PUMPING OF OPTICAL WAVEGUIDES INTO CONDUITS

(71) Applicant: HALLIBURTON ENERGY SERVICES, INC., Houston, TX (US)

(72) Inventors: Maximo G. Michaelis, Houston, TX (US); Glenn McColpin, Katy, TX (US); Brian V. Park, Houston, TX (US); Mikko Jaaskelainen, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/399,047

(22) PCT Filed: Dec. 17, 2013

(86) PCT No.: PCT/US2013/075846
§ 371 (c)(1),
(2) Date: Nov. 5, 2014

(87) PCT Pub. No.: WO2015/094194
PCT Pub. Date: Jun. 25, 2015

(65) Prior Publication Data
US 2015/0378124 A1 Dec. 31, 2015

(51) Int. Cl.
*G02B 6/00* (2006.01)
*G02B 6/44* (2006.01)
*E21B 41/00* (2006.01)

(52) U.S. Cl.
CPC .............. *G02B 6/4464* (2013.01); *E21B 41/00* (2013.01)

(58) Field of Classification Search
CPC .............................. G02B 6/4464; E21B 41/00
USPC ..................................... 385/134, 12; 333/24.2
See application file for complete search history.

(56) References Cited

U.S. PATENT DOCUMENTS

| 5,143,353 | A | * | 9/1992 | Sano | G02B 6/4464 254/134.3 FT |
| 5,570,437 | A | | 10/1996 | Kluth et al. | |
| 5,582,064 | A | | 12/1996 | Kluth | |
| 5,813,658 | A | * | 9/1998 | Kaminski | B65H 51/14 254/134.4 |
| 5,831,934 | A | * | 11/1998 | Gill | G01V 1/48 367/25 |
| RE37,283 | E | | 7/2001 | Kluth et al. | |

(Continued)

OTHER PUBLICATIONS

Search Report and Written Opinion issued Oct. 13, 2014 for International Application No. PCT/US13/75846, 9 pages.

(Continued)

*Primary Examiner* — Ellen Kim
(74) *Attorney, Agent, or Firm* — Schwegman Lundberg & Woessner, P.A.; John W. Wustenberg

(57) ABSTRACT

An optical waveguide pumping method can include pumping a liquid fluid through a conduit, thereby pumping an optical waveguide into the conduit, and operating a fluid recovery device, so that fluid pressure in the conduit is less than a vapor pressure of the fluid and/or fluid temperature in the conduit is reduced from above a boiling point temperature of the fluid to below the boiling point temperature of the fluid. An optical waveguide pumping system can include a pump which pumps a liquid fluid into a conduit and thereby pumps an optical waveguide into the conduit, and a fluid recovery device connected to the conduit. The fluid recovery device reduces fluid pressure in the conduit to below a vapor pressure of the fluid and/or reduces fluid temperature in the conduit from above a boiling point temperature of the fluid to below the boiling point temperature of the fluid.

20 Claims, 4 Drawing Sheets

(56) References Cited

U.S. PATENT DOCUMENTS

| | | | |
|---|---|---|---|
| RE38,052 E | 4/2003 | Kluth | |
| 7,173,577 B2* | 2/2007 | Brown | H01Q 1/281 343/909 |
| 7,940,389 B2* | 5/2011 | Rogers | G01L 11/025 356/365 |
| 8,573,313 B2* | 11/2013 | Lovell | E21B 19/22 166/250.01 |
| 9,151,866 B2* | 10/2015 | Cavender | G01V 11/002 |
| 2002/0109080 A1* | 8/2002 | Tubel | E21B 23/03 250/227.14 |
| 2004/0045705 A1 | 3/2004 | Gardner et al. | |
| 2004/0047534 A1 | 3/2004 | Shah et al. | |
| 2005/0017819 A1* | 1/2005 | Brown | H01P 1/222 333/81 B |
| 2005/0034873 A1 | 2/2005 | Coon et al. | |
| 2005/0074196 A1 | 4/2005 | Grigsby et al. | |
| 2006/0115203 A1 | 6/2006 | Wait et al. | |

OTHER PUBLICATIONS

Pinnacle Reservoir Monitoring StimWatch® Stimulation Monitoring Service product brochure, Halliburton H04481, dated Jun. 2010, 4 pages.

Schlumberger WellWatcher BriteBlue Multimode DTS Fiber-Pumped Service_retrieved Oct. 31, 2014, http://www.slb.com/services/completions/wellwatcher/wellwatcher_dts/pumped_fiber.aspx, 1 page.

Pinnacle Fiber Optic Sensing Technologies product brochure, Halliburton H09710, dated 2012, 12 pages.

Developing the Heavy Oil and Oil Sands Assets product brochure, Halliburton H06153, dated 2008, 46 pages.

Halliburton online Completion Solutions Catalog, Intelligent Completions section 3, pp. 1-54, retrieved Oct. 31, 2014, http://www.halliburton.com/public/cps/contents/Books_and_Catalogs/web/CPSCatalog/03_Intelligent_Completions.pdf, 54 pages.

* cited by examiner

PUMPING OF OPTICAL WAVEGUIDES INTO CONDUITS

CROSS-REFERENCE TO RELATED APPLICATION

This application is a national stage under 35 USC 371 of International Application No. PCT/US13/75846, filed on 17 Dec. 2013. The entire disclosure of this prior application is incorporated herein by this reference.

TECHNICAL FIELD

This disclosure relates generally to equipment utilized and operations performed in conjunction with fiber pumping operations and, in one example described below, more particularly provides for pumping of optical waveguides into conduits.

BACKGROUND

An optical fiber can be "pumped" into a tubing by flowing a fluid through the tubing, so that fluid drag acting on the optical fiber draws the optical fiber into the tubing. Optical fibers can, in this manner, be installed in wells, along pipelines, or at other locations. Therefore, it will be appreciated that advancements are continually needed in the art of pumping optical waveguides into conduits.

DETAILED DESCRIPTION

Figure 1:
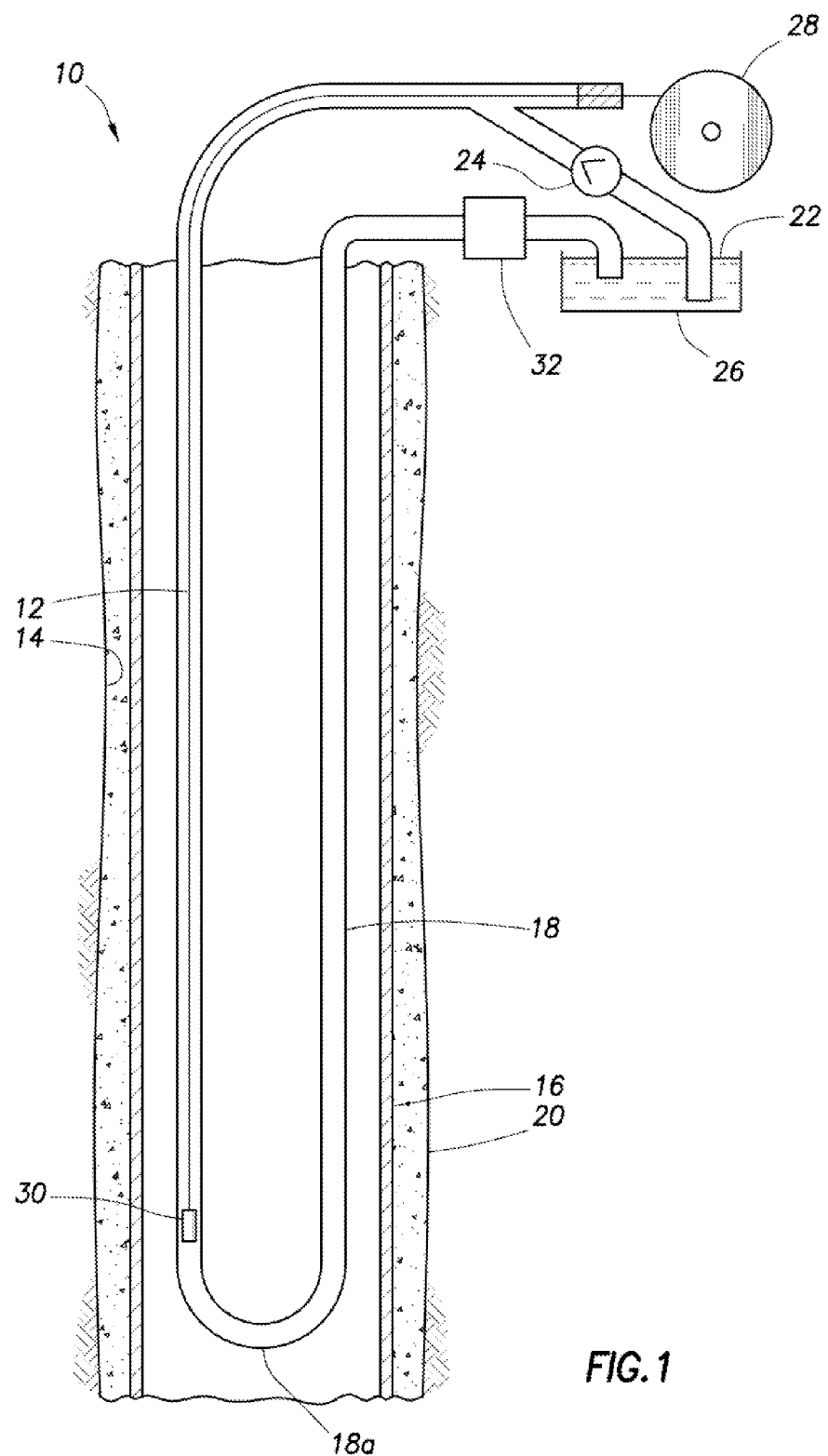
FIG. 1 is a representative partially cross-sectional view of an optical waveguide pumping system and method that can embody the principles of this disclosure.

Representatively illustrated in FIG. 1 is an optical waveguide pumping system 10 and an associated method which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, it is desired to install an optical waveguide 12 (such as, an optical fiber, an optical ribbon, etc.) in a subterranean wellbore 14. In other examples, the optical waveguide 12 could be installed proximate (or in) a pipeline or other facility. Thus, the scope of this disclosure is not limited to any particular location or facility in which the optical waveguide 12 is installed.

In order to facilitate installation of the optical waveguide 12, a conduit 18 is previously installed in the wellbore 14. In the FIG. 1 example, the conduit 18 extends in a section of the wellbore 14 lined with casing 16 and cement 20, but in other examples the conduit could extend in an uncased or open hole section of the wellbore.

The conduit 18 is depicted in FIG. 1 as comprising tubing, also known to those skilled in the art as "control line." The conduit 18 is positioned within the casing 16. However, in other examples, the conduit 18 could be positioned external to the casing 16 (such as, in the cement 20), or in a wall of the casing or other tubular string in the well. The conduit 18 could comprise a passage extending through various types of structures in the wellbore 14 (e.g., not necessarily in a tubing).

In the FIG. 1 example, the conduit 18 is "double-ended," in that two side-by-side sections of the conduit extend into the wellbore 14 and are joined therein by a "turn-around" 18a. This allows a fluid 22 to be pumped into one section of the conduit 18, and the fluid is returned via the other section of the conduit. In other examples, the conduit 18 may not be double-ended at surface, so that the fluid 22 is pumped through the conduit and is expelled into the wellbore 14 downhole (for example, via a check valve at a distal end of the conduit).

The optical waveguide 12 may be installed into all, or only a portion, of the conduit 18. In some examples, the optical waveguide 12 could extend from the surface to the turn-around 18a in only one of the side-by-side sections of the conduit 18, and in other examples the optical waveguide could extend in both side-by-side sections of the conduit. The scope of this disclosure is not limited to any particular extent of installation of the optical waveguide 12 into the conduit 18.

A pump 24 pumps the fluid 22 from a reservoir 26 and into the conduit 18. As the fluid 22 flows through the conduit 18, fluid drag on the optical waveguide 12 causes it to be drawn into the conduit from a spool 28. An enlarged or otherwise drag-increasing tip 30 can be used at a distal end of the optical waveguide 12 to help draw the optical waveguide into the conduit 18 and prevent bunching of the optical waveguide in the conduit.

The fluid 22 can be a liquid (such as, isopropyl alcohol) at ambient surface conditions. However, after exposure to elevated temperatures in the wellbore 14, the fluid 22 that returns to the surface can boil or otherwise pose a hazard. For example, if the fluid 22 is a hydrocarbon fluid (such as, isopropyl alcohol), the vaporized fluid could be explosive or otherwise pose a danger to personnel exposed to the vaporized fluid.

Therefore, it would be beneficial to be able to reduce a temperature of the fluid 22 after it has returned from the wellbore 14. For example, the fluid 22 could be cooled in the conduit 18 prior to the fluid returning to the reservoir 26 (which can be at ambient surface conditions, such as, at atmospheric pressure).

In some examples, the fluid 22 can be cooled from greater than its boiling point temperature to less than its boiling point temperature after it returns from the wellbore 14. As used herein, the term "boiling point temperature" is used to indicate a temperature at which a liquid begins to boil at standard atmospheric pressure (1 bar).

After the pumping operation is concluded, the fluid 22 can be flushed out of the conduit 18 (for example, to prevent hydrogen darkening of the optical waveguide 12) with a compressed gas, such as, air or nitrogen (or another inert gas). However, even after substantial flushing with gas, traces of the fluid 22 can remain in the conduit 18.

Therefore, it would be beneficial to be able to reduce a fluid pressure in the conduit 18 to less than a vapor pressure of the fluid 22 (for example, after the flushing operation), so that any fluid remaining in the conduit can be vaporized and can thereby be readily removed from the conduit. As used herein, the term "vapor pressure" is used to indicate a pressure of a vapor in equilibrium with its condensed (solid and/or liquid) phase(s) at standard ambient temperature (25° C.).

In some examples, reducing pressure in the conduit 18 to less than the vapor pressure of the fluid 22 may be followed by flushing the conduit 18 again with air or an inert gas. In some examples, pressure in the conduit 18 may remain less than the vapor pressure of the fluid 22, or at least less than atmospheric pressure at the surface (such as, by closing off the conduit at the surface after the pressure therein has been reduced), after the completion of the installation operation.

To obtain the benefits mentioned above of safely returning the fluid 22 to the surface and/or removing the fluid from the conduit 18 after the installation operation, the system 10 includes a fluid recovery device 32. Note that it is not necessary for the fluid recovery device 32 to obtain any particular benefit or combination of benefits, in keeping with the scope of this disclosure.

For example, the fluid recovery device 32 could be used to reduce pressure in the conduit 18 to below the vapor pressure of the fluid 22, in order to remove the fluid from the conduit, even if the temperature of the fluid is not decreased by the fluid recovery device to below its boiling point temperature. Such a fluid recovery device 32 could be useful, for example, in cases where the fluid 22 does not return to the surface (e.g., the conduit 18 is not double-ended), although such a fluid recovery device could also be useful even though the fluid does return to the surface.

As another example, the fluid recovery device 32 could be used to reduce the temperature of the fluid 22 that returns from the wellbore 14, in order to prevent boiling of the fluid, even if the pressure in the conduit 18 is not thereafter reduced to less than a vapor pressure of the fluid. Such a fluid recovery device 32 could be useful, for example, in cases where flushing the conduit 18 with gas is highly effective in removing the fluid 22 from the conduit.

In the FIG. 1 example, the fluid recovery device 32 is depicted as being connected in a return section of the conduit 18 (e.g., between the wellbore 14 and the reservoir 26). In other examples, the fluid recovery device 32 could be otherwise connected, such as, between the pump 24 and the wellbore 14. The scope of this disclosure is not limited to any particular position, configuration or arrangement of components in the system 10.

Figure 2:
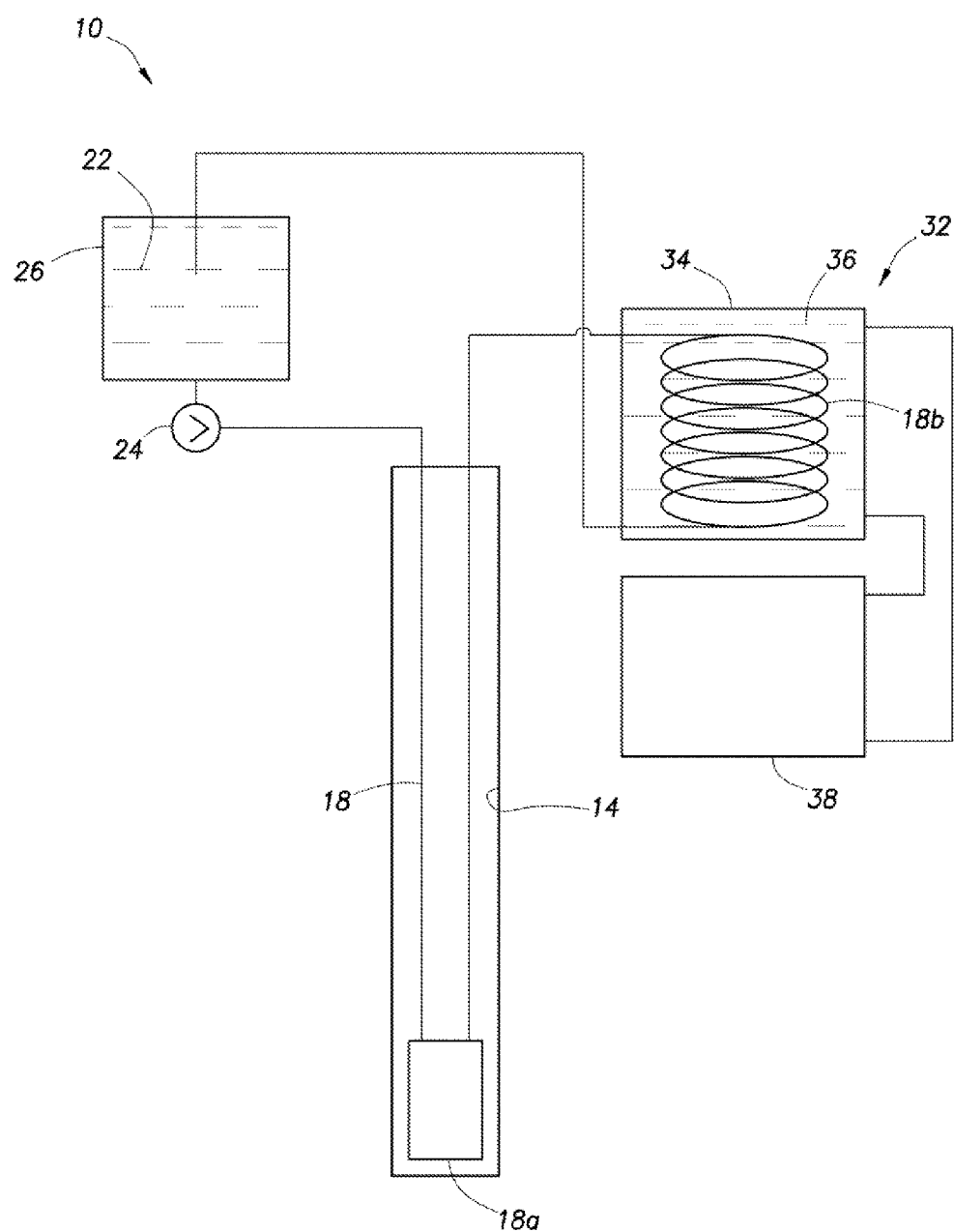
FIG. 2 is a representative schematic view of an example of a fluid recovery device that can embody the principles of this disclosure.

Referring additionally now to FIG. 2, an example of a fluid recovery device 32 that may be used with the system 10 and method of FIG. 1 is representatively illustrated. However, the fluid recovery device 32 could be used with other systems and methods, in keeping with the principles of this disclosure.

The optical waveguide 12 is not shown in FIG. 2 for illustrative clarity, but it should be appreciated that the optical waveguide and associated equipment (such as, the spool 28, etc.) would be provided with the FIG. 2 system 10.

In the FIG. 2 example, the conduit 18 passes through a cooling tank 34 between the wellbore 14 and the reservoir 26. Preferably, a tortuous section 18b of the conduit 18 is contained in the cooling tank 34. As depicted in FIG. 2, the tortuous section 18b comprises a helical coil of the conduit 18, but in other examples tortuosity could be achieved by use of zig-zag sections, multiple direction reversals, etc. Thus, the scope of this disclosure is not limited to any particular configuration or arrangement of components in the fluid recovery device 32.

A cooling fluid 36 in the cooling tank 34 is maintained at a sufficiently low temperature, and is in contact with the conduit 18, so that the temperature of the fluid 22 in the conduit is reduced to below its boiling point temperature when it exits the cooling tank and returns to the reservoir 26. A refrigeration unit or chiller 38 can be used to extract heat from the cooling fluid 36, and to circulate the reduced temperature cooling fluid through the cooling tank 34.

Figure 3:
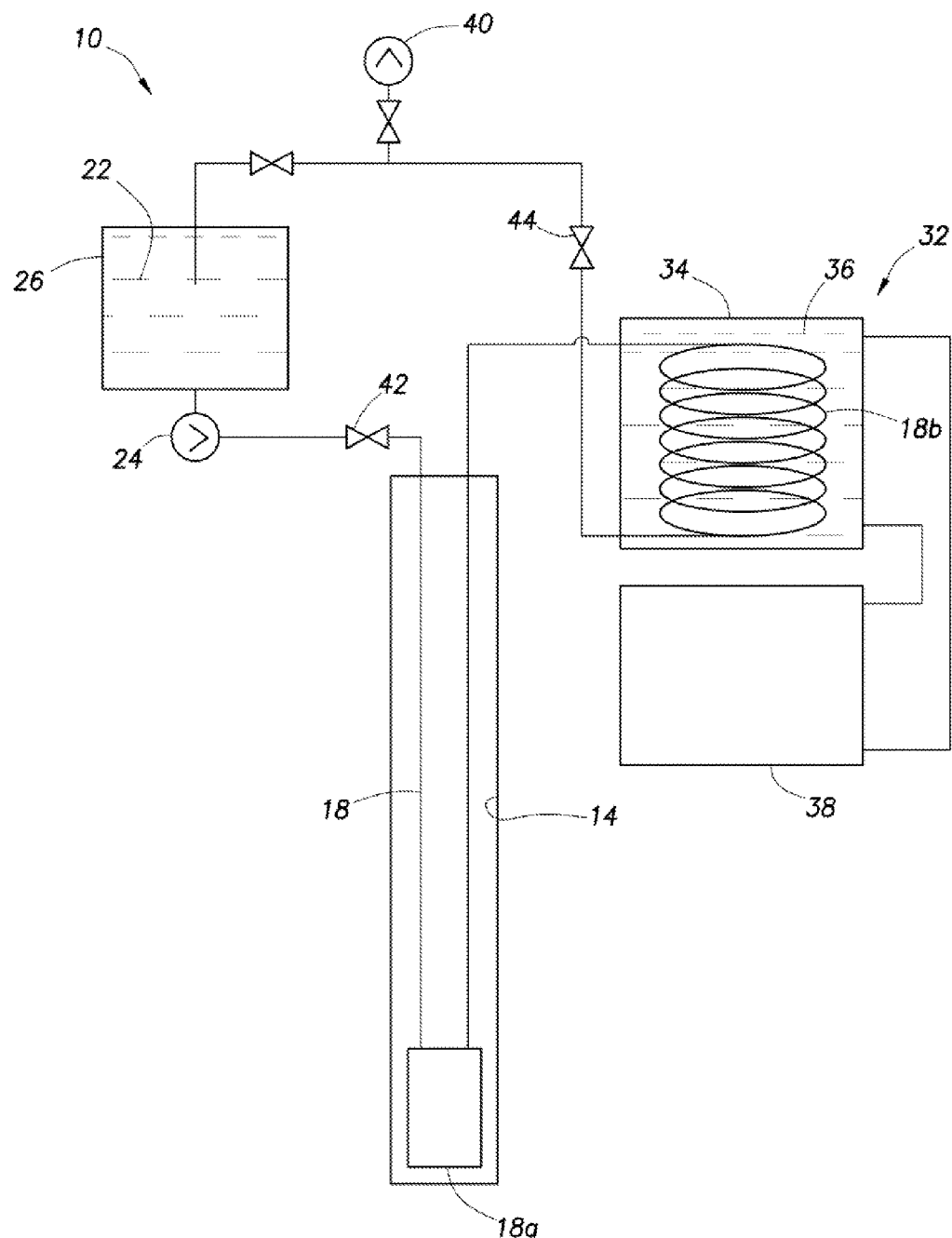
FIG. 3 is a representative schematic view of another example of the fluid recovery device.

Referring additionally now to FIG. 3, another example of the fluid recovery device 32 is representatively illustrated. In this example, the fluid recovery device 32 includes a vacuum pump 40 connected to the conduit 18 between the cooling tank 34 and the reservoir 26.

The vacuum pump 40 is used to reduce pressure in the conduit 18 to below the vapor pressure of the fluid 22, for example, after the optical waveguide 12 has been installed in the conduit and most of the fluid has been flushed from the conduit. The vacuum pump 40 is depicted in FIG. 3 as being connected to the conduit 18 between the cooling tank 34 and the reservoir 26, but in other examples, the vacuum pump could be connected to the conduit at another location (such as, between the pump 24 and the wellbore 14).

Also depicted in FIG. 3 are throttle valves, chokes, or other types of flow control devices 42, 44 which variably restrict flow through the conduit 18. It will be appreciated that, by regulating flow of the fluid 22 through the conduit 18, the pressure of the fluid in the conduit can be controlled.

For example, by decreasing restriction to flow of the fluid 22 from the pump 24 into the conduit 18 in the wellbore 14, the pressure of the fluid when it is heated in the wellbore and returns therefrom can be increased. Similarly, by increasing restriction to flow of the fluid 22 from the cooling tank 34 to the reservoir 26, the pressure of the fluid when it is heated in the wellbore 14 and returns therefrom can be increased.

The flow control devices 42, 44 can, thus, be used to maintain sufficient pressure of the fluid 22 in the conduit 18, so that it does not boil prior to the fluid being cooled in the cooling tank 34. After the fluid 22 has been cooled to below its boiling point temperature, it can be safely returned to the reservoir 26.

Figure 4:
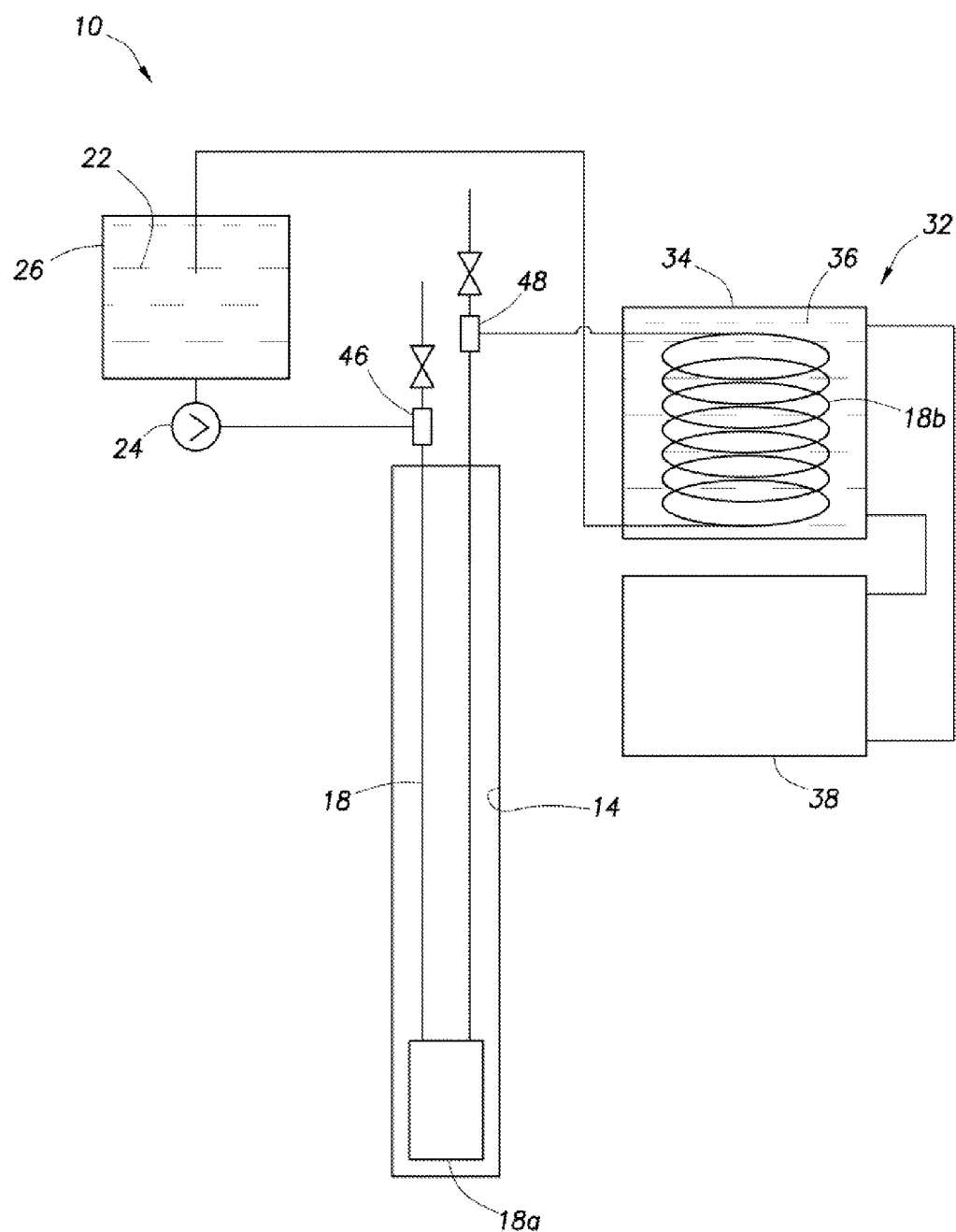
FIG. 4 is a representative schematic view of yet another example of the fluid recovery device.

Referring additionally now to FIG. 4, another example of the fluid recovery device 32 is representatively illustrated. In this example, three-way or "T" fittings 46, 48 are used to provide access to the conduit 18 between the pump 24 and the wellbore 14, and between the wellbore and the cooling tank 34.

The fittings 46, 48 can be useful for changing a circulation direction of the fluid 22 or a purging gas through the conduit 18 in the wellbore 14, for example, in cases in which it is desirable to pump out the optical waveguide 12 and/or pump another optical waveguide into one leg of the conduit. The fittings 46, 48 can allow fluid 22 to bypass the optical waveguide 12 in cases where it may be desirable to maintain one optical waveguide in the wellbore 14 while pumping another optical waveguide into another leg of the conduit 18.

In addition, this can allow continuous optical monitoring of one optical waveguide 12 while pumping in a second optical waveguide. The first optical waveguide 12 can be spliced to a fiber optic pressure penetrator (not shown) to allow safe pumping of the second optical waveguide while monitoring the first optical waveguide.

As depicted in FIG. 4, the system 10 is configured to pump an optical waveguide into the conduit 18 (e.g., fully or completely to the turnaround 18a) via the fitting 46, while fluid 22 returned from the conduit is flowed to the cooling tank 34 via the fitting 48. To pump another optical waveguide into the conduit 18 via the fitting 48 (e.g., fully or completely to the turnaround 18a), the pump 24 can be connected to the fitting 48, and fluid 22 returned from the conduit can be flowed to the cooling tank 34 via the fitting 46.

It may now be fully appreciated that the above disclosure provides significant advances to the art of pumping optical waveguides into conduits. In an example described above, the fluid 22 can be safely returned from the conduit 18 to the reservoir 26 without boiling. In another example, the fluid 22 can be more completely purged from the conduit 18 by reducing pressure therein to below a vapor pressure of the fluid.

The above disclosure provides to the art an optical waveguide pumping method. In one example, the method can comprise: pumping a liquid fluid 22 through a conduit 18, thereby causing an optical waveguide 12 to extend further into the conduit 18; and operating a fluid recovery device 32, thereby causing a condition to exist in the conduit 18, the condition comprising a) fluid pressure in the conduit 18 being less than a vapor pressure of the fluid 22, and/or b) fluid temperature in the conduit 18 being reduced from above a boiling point temperature of the fluid 22 to below the boiling point temperature of the fluid 22.

The step of operating the fluid recovery device 32 may be performed after the fluid 22 is substantially purged from the conduit 18.

The fluid pressure in the conduit 18 may be reduced to less than the vapor pressure of the fluid 22 after flowing a gas through the conduit 18.

The step of operating the fluid recovery device 32 can include operating a vacuum pump 40, thereby reducing the fluid pressure in the conduit 18 to less than atmospheric pressure.

Operating the fluid recovery device 32 may include cooling the fluid 22 in the conduit 18 prior to returning the fluid 22 to a reservoir 26 from which the fluid 22 is pumped into the conduit 18.

Operating the fluid recovery device 32 may include immersing the conduit 18 in a cooling tank 34.

An optical waveguide pumping system 10 is also provided to the art by the above disclosure. In one example, the system 10 can include a pump 24 which pumps a liquid fluid 22 into a conduit 18 and thereby causes an optical waveguide 12 to progressively extend into the conduit 18, and a fluid recovery device 32 connected to the conduit 18. The fluid recovery device 32 reduces fluid pressure in the conduit 18 to below a vapor pressure of the fluid 22.

The fluid recovery device 32 may comprise a vacuum pump 40.

The fluid recovery device 32 may reduce the fluid pressure to below atmospheric pressure.

The fluid recovery device 32 may reduce the fluid pressure while the conduit 18 is substantially filled with a gas.

The conduit 18 may extend into a wellbore 14. In other examples, the conduit 18 may not be in a wellbore.

The conduit may extend into a wellbore 14 between the pump 24 and the fluid recovery device 32.

The fluid recovery device 32 may reduce fluid temperature in the conduit 18 from above a boiling point temperature of the fluid 22 to below the boiling point temperature of the fluid 22.

Another optical waveguide pumping system 10 described above can comprise a pump 24 which pumps a liquid fluid 22 into a conduit 18 and thereby causes an optical waveguide 12 to progressively extend into the conduit 18, and a fluid recovery device 32 connected to the conduit 18. The fluid recovery device 32 reduces fluid temperature in the conduit 18 from above a boiling point temperature of the fluid 22 to below the boiling point temperature of the fluid 22.

The conduit 18 may extend into a wellbore 14 between the pump 24 and the fluid recovery device 32.

The fluid recovery device 32 may comprise a cooling tank 34. A tortuous section 18b of the conduit 18 can be contained in the cooling tank 34. The fluid recovery device 32 may also comprise a cooling fluid 36 which contacts the conduit 18 in the cooling tank 34.

The system 10 may include a flow control device 44 connected to the conduit 18 upstream of a reservoir 26 from which the fluid 22 is pumped by the pump 24. The flow control device 44 variably restricts flow through the conduit 18 and thereby increases fluid pressure in the conduit 18.

The fluid recovery device 32 reduces fluid pressure in the conduit 18 to below a vapor pressure of the fluid 22.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. An optical waveguide pumping method, comprising:
    pumping a liquid fluid through a conduit, thereby causing an optical waveguide to extend further into the conduit; and
    operating a fluid recovery device, thereby causing a condition to exist in the conduit, the condition being selected from the group consisting of: a) fluid pressure in the conduit being less than a vapor pressure of the fluid, and b) fluid temperature in the conduit being reduced from above a boiling point temperature of the fluid to below the boiling point temperature of the fluid.

2. The method of claim 1, wherein operating the fluid recovery device is performed after the fluid is substantially purged from the conduit.

3. The method of claim 1, wherein the fluid pressure in the conduit is reduced to less than the vapor pressure of the fluid after flowing a gas through the conduit.

4. The method of claim 1, wherein operating the fluid recovery device further comprises operating a vacuum pump, thereby reducing the fluid pressure in the conduit to less than atmospheric pressure.

5. The method of claim 1, wherein operating the fluid recovery device further comprises cooling the fluid in the conduit prior to returning the fluid to a reservoir from which the fluid is pumped into the conduit.

6. The method of claim 1, wherein operating the fluid recovery device further comprises immersing the conduit in a cooling tank.

7. An optical waveguide pumping system, comprising:
a pump which pumps a liquid fluid into a conduit and thereby causes an optical waveguide to progressively extend into the conduit; and
a fluid recovery device connected to the conduit, wherein the fluid recovery device reduces fluid pressure in the conduit to below a vapor pressure of the fluid.

8. The system of claim 7, wherein the fluid recovery device comprises a vacuum pump.

9. The system of claim 7, wherein the fluid recovery device reduces the fluid pressure to below atmospheric pressure.

10. The system of claim 7, wherein the fluid recovery device reduces the fluid pressure while the conduit is substantially filled with a gas.

11. The system of claim 7, wherein the conduit extends into a wellbore.

12. The system of claim 7, wherein the conduit extends into a wellbore between the pump and the fluid recovery device.

13. The system of claim 7, wherein the fluid recovery device reduces fluid temperature in the conduit from above a boiling point temperature of the fluid to below the boiling point temperature of the fluid.

14. An optical waveguide pumping system, comprising:
a pump which pumps a liquid fluid into a conduit and thereby causes an optical waveguide to progressively extend into the conduit; and
a fluid recovery device connected to the conduit, wherein the fluid recovery device reduces fluid temperature in the conduit from above a boiling point temperature of the fluid to below the boiling point temperature of the fluid.

15. The system of claim 14, wherein the conduit extends into a wellbore between the pump and the fluid recovery device.

16. The system of claim 14, wherein the fluid recovery device comprises a cooling tank.

17. The system of claim 16, wherein a tortuous section of the conduit is contained in the cooling tank.

18. The system of claim 16, wherein the fluid recovery device further comprises a cooling fluid which contacts the conduit in the cooling tank.

19. The system of claim 14, further comprising a flow control device connected to the conduit upstream of a reservoir from which the fluid is pumped by the pump, wherein the flow control device variably restricts flow through the conduit and thereby increases fluid pressure in the conduit.

20. The system of claim 14, wherein the fluid recovery device reduces fluid pressure in the conduit to below a vapor pressure of the fluid.

* * * * *